May 26, 1925.
A. N. PETERS
TRAP NEST
Filed Jan. 8, 1924
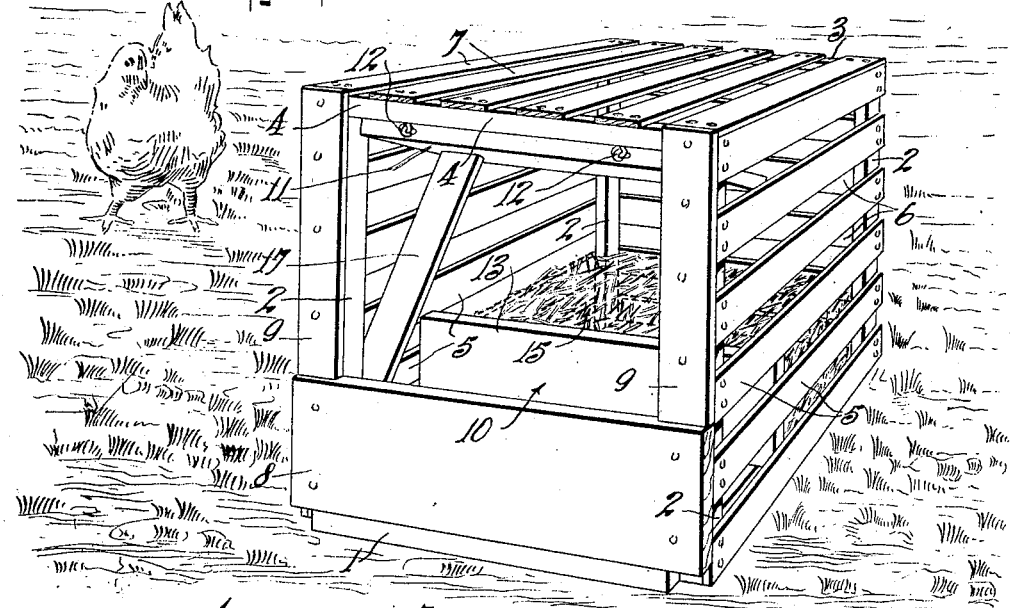
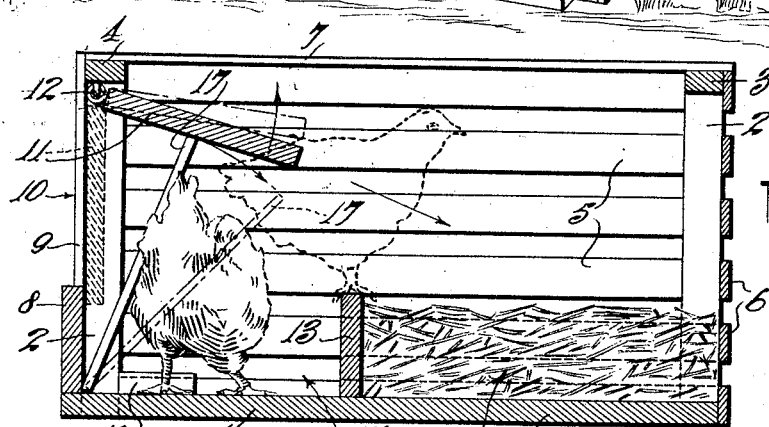
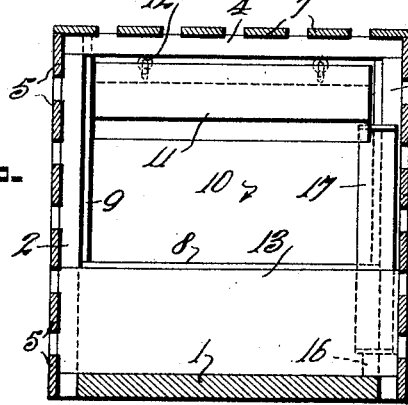
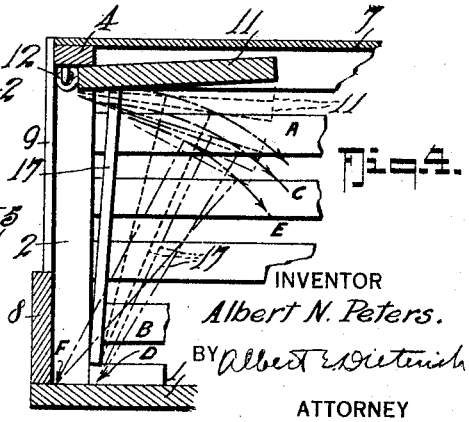
INVENTOR
Albert N. Peters.
BY Albert E. Dietrich
ATTORNEY Patented May 26, 1925.

1,539,000

UNITED STATES PATENT OFFICE.

ALBERT NEWTON PETERS, OF CRANE, MISSOURI.

TRAP NEST.

Application filed January 8, 1924. Serial No. 685,027.

*To all whom it may concern:*

Be it known that I, ALBERT N. PETERS, a citizen of the United States, residing at Crane, in the county of Stone and State of Missouri, have invented a new and Improved Trap Nest, of which the following is a specification.

The invention resides in the provision of a trap nest of a very simple and inexpensive structure, which is readily convertible into an open nest at the will of the user and without the necessity of making complicated adjustments and alterations of structure; and in which the parts are so constructed and cooperatively arranged that, when the invention is being used as a trap nest, the hens are positively trapped, after they have been given an opportunity to inspect a portion of said nest, and in a manner positively preventing a "backing out" of the hen, or the occupancy of the nest by more than one hen.

Trap nests are used by poultry men as an efficiency medium designed as a means by the use of which records may be kept which will enable them to observe which hens or class of hens are laying the most, that breeders may be selected for heavy egg production; also to ascertain the amount of profit they afford above the cost of their keep, thereby making it possible for them to cull out those of the hens which are not laying enough to pay for their keep, or in other words, those which are being fed at a loss.

The general poultry man does not use trap nests extensively because as they are now commonly constructed they are not only complex, expensive and hard to build and operate practically, but are also usually practical for use as a trap nest only and not readily convertible into an open nest for ordinary use.

It is almost necessary that a trap nest, to be practical, must be convertible because the general user has not time to attend to the non-convertible trap nest in the manner in which they should be attended, but often experiences days on which he will not be able to give the same his attention. At such times it would be very convenient if he was able to convert the trap nest into a common open nest until he should again desire to reconvert the same, thus occasioning full use of the single nest without hindering the hens using the same and with a loss of record for that period only during which the nest was converted.

I am aware that efforts have been made to supply the need of poultry men as above referred to, but in such embodiments of the broad idea of a convertible trap nest more or less complicated mechanisms are employed which make such contraptions impractical for use generally, due to the comparison between the cost therefor and the amount of use obtainable therefrom.

It is therefore the primary object of this invention to provide a very simple, inexpensive, and practical convertible trap nest, capable of being operated as a trap nest one day and as an open nest the next, without alteration, change of parts, or any inconvenience to the operator or hens using the same, and which is so constructed as to accomplish its purpose without the use of pivot levers, trip walks, spring trigger devices, balanced slides, or any of the other complicated mechanisms usually used in nests of this type.

More practically the invention seeks to provide a nest of the type stated which includes an entrance end, with which are associated the trapping devices, a nest portion, and a front clear portion; which said trapping devices are so constructed and arranged as to be adjustable to various ranges of operation, including a locked or open nest position, and not subject to being clogged against perfect function, and which, while associated with the entrance end of the trap have portions thereof so cooperative with the trap portion of the nest as to be engaged by the hen as she starts to enter that nest portion, after having inspected the clear portion, and in a manner for releasing the devices to enable them to adjust themselves to the trapping position, the engagement between these devices and the hen being such as will prevent any attempted "backing out" before the trapping function is completed and which acts to force the hen directly into and upon said nest portion.

With the above and other objects in view the invention further resides in those novel details of construction, combination and arrangement of parts, all of which will be first fully described, then be particularly pointed out in the appended claims, reference being had to the accompanying drawing, in which:

Figure 1 is a perspective view of the invention ready for use.

Figure 2 is a central vertical longitudinal section of the invention.

Figure 3 is a cross section taken across the nest compartment just beyond the division board and looking toward the entrance end.

Figure 4 is a fragmentary view similar to the left end portion of Figure 2 and diagrammatically illustrates various adjusted positions of the trap door.

In the practical development of my invention, I have constructed the same to include a bottom 1 to the corners of which are secured vertically positioned rectangular shaped corner posts 2, to the top ends of the rear pair of which is secured a cross bar 3 and to the top ends of the front pair of which is secured a top cross bar 4. Slats 5 are nailed to the outer faces of the uprights 2 to provide opposing sides and similar slats 6 are nailed across the rear pair of uprights 2 to comprise an end wall, while similar slats 7 are nailed across the top faces of the front and rear cross bars 3 and 4 to provide a top, it being observed that all of these slats 5, 6 and 7 are spaced apart to provide a slatted box, the purpose of which will later appear.

A front board 8 is secured across the bottom portions of the uprights 2 and a short vertical slat 9 is secured to each of the front posts 2 to extend from the said board 8 to a point flush with the tops of the slats 7 and these slats 9 are of such width that they extend over the ends of the side slats 5 to be flush with the outer faces thereof and slightly inward beyond the uprights 2 so as to cooperate with the cross bar 4 and the board 8 in providing an entrance doorway 10 through which the hens may readily enter the nest, as later described. It will be observed that all of the slats 5, 6, 7 and 9 are of the same width of material, such as laths, thus making it possible to construct all of these parts by the mere cutting of the lengths thereof of the same stock material.

A trap door 11 is hingedly suspended from the front top cross bar through the medium of the double screw eye pivots 12, the dimensions and manner of hanging of this door being such that the same, when in the trapping position, will hang vertically, with its lowermost edge abutting the top portion of the inside face of the cross board 8, see dotted lines in Figure 2.

One of the particular features of the invention resides in the separation of the complete nest structure into the portions, that is, a front clear portion and a rear nest portion. This is accomplished by providing a cross division board 13 positioned uprightly across the bottom 1, as shown in Figures 1 and 2, and which serves to separate the complete nest into the front compartment 14, in which plenty of room is provided for the hen to enter and make an inspection of the trap without effecting a release of the trap devices, and the nest portion proper designated 15, which may be made up into a suitable hen's nest by providing suitable soft material, such as straw or excelsior, as is indicated in the said figures, the division board 13 cooperating with the slats 5 and 6 in confining this material to form the nest.

I provide a trigger prop supporting block 16 which is secured to the bottom against one of the front uprights or posts 2, and a trigger prop 17 is provided which is preferably constructed of the same material of which the various slats are formed and which is adapted to be used as a trigger prop for supporting the trap door 11 in the manner illustrated in all of the figures of the drawings, particularly Figure 4. It will be observed from Figure 4 that with this trigger prop 17, in cooperation with the facilities for positioning the same, which I have provided, it is possible to vary the set position of the trap door 11 through quite a range, it being possible to set this door at any range, with its inwardly extended edge at a point about four inches distant from the board 13 and in cooperative relation therewith, to the position illustrated in full lines in the said Figure 4, which illustrates the locking of the trap door to the open position, thus adapting the same to use as an ordinary open nest. This adjustment is made possible by the use of the trigger prop which it will be observed is not connected in any way to the trap but may be varied in position, as illustrated at B, D, F, these letters indicating pivot points at which this prop may be set, the one B being at a point upon the block 16 and against the adjacent corner post 2, the one F being against the board 8 and the adjacent corner post 2 and the one D indicating a point against that one of the corner posts 2 opposite the side to which the block 16 is secured. It will be obvious from the said figure that when the prop is positioned as at B the range of adjustment there possible in propping the door will be on the arc A; when positioned at D the adjustment will be on the arc C; and when positioned as at F the adjustment will be on the arc E. It will be apparent from this figure that the range of adjustment or set of the door 11 is very wide, making it possible to adjust the trap door for perfectly cooperating with the division board 13 and with the particular type of hen which the poultry man contemplates trapping.

In Figures 1 and 2, in full lines, is illustrated a set position of the trap. Describing the operation of my improved convertible trap nest, let us assume that the hen illustrated in Figure 1, searching for a comfortable soft nest in which to lay an egg enters the door way 10 over the cross board 8 and steps down into the clear compartment 14 where she will be free to carefully inspect that portion of the nest without in any way interfering with the trap devices, see full lines, Figure 2. The hen, now perfectly confident of the safety of her surroundings, and viewing the soft nest material beyond the division board 13, will mount that board in an effort to enter the nest portion 15 (see dotted lines on Figure 2). As the hen mounts the board 13 she must of necessity engage with the extended end of the trap door 11 and lift the same slightly, sufficient to permit a release and falling of the trigger prop 17, as indicated in said Figure 2. It will be observed that the point of contact between the hen's back and the extended end of the door is well beyond the shoulders of the hen, making it impossible for the hen, resenting the weight thus distributed upon her back, to endeavor to turn or back off of the cross board 13 in a manner which would prevent the trapping action of the door; but, on the contrary, the point of contact is such as will force the hen forwardly, as is indicated by the arrow on Figure 2, and into the nest compartment, the trap door falling to the position illustrated by dotted lines on the said figure where it hangs by gravity in a manner for effectively closing off the entrance of any other hens which may desire to use the nest, and also preventing escape of the hen already within the nest.

It should be understood that if the poultry man is contemplating using the trap nest for trapping a small breed of hens he may position the trigger prop 17 at the point F, which makes possible the lowest adjustment of the door in cooperation with the cross board 13, as above clearly set forth, and he may vary the set of this door in accordance with the size of hens which he is working with by positioning the said trigger prop, as indicated at the point B, upon the block 16, or at the opposite side of the trap nest at the point D, as he may desire, so that the door 11 may be readily set for perfect cooperation with the cross board 13 in consideration of the size of the hens the poultry man contemplates trapping.

By reason of providing the very simple construction of convertible trap nest illustrated in the drawings it is possible for the general user (as well as the expert) to use my improved nest since the cost of production of the same will be very small, and it must be clear that the same is readily convertible to both uses without alteration of parts, setting of complicated levers, or of other complicated mechanism with attendant inconvenience to the user of said nest.

It should be also apparent that by the use of the simple construction I have disclosed especially considering the simple trigger prop and manner of positioning and adjusting the same, it will be apparent that I have provided a practical convertible trap nest comprising no complicated mechanism whatever which may, by the weakening of a spring, the bending of a lever, or the clogging of a pivoted part by straw or sticks, be rendered effectively non-operative. It is a common experience with the usual type of trap nest embodying complicated mechanisms to have small particles of trash or other débris interfere with and clog the working mechanism. In my construction the simple trigger prop 17 is not secured pivotally or otherwise to any part of the trap; this for a double purpose, first that it may be readily changed in position and adjusted as indicated by the letters A to F, and second, to prevent the same from being rendered inoperative by clogging, as before referred to. By thus providing and positioning the simple trigger prop 17 the same is effectively operable under any and all conditions. Should it be possible that a stick or bits of straw or other débris be projected through one of the slats or be positioned in any part of the trap in a manner for engaging the trigger in the path of its fall in releasing the trap door 11 from its set position, it would be possible for the said trigger prop to be diverted and to fall laterally as well as forwardly downwardly, that is, the said trigger prop is not held to any fixed path of movement but is permitted to fall as it will, regardless of any hindering agency which might tend to interfere therewith.

While I have illustrated a practical proportion of convertible trap nest, I desire to be understood that the proportions of the nest may be readily varied to accommodate the uses to which it is to be put, that is, the nest may be provided with a larger entrance, may be wider or higher which may all be accomplished, if desired, so long as the relative cooperation of the trap door 11 and the cross board 13 is proportionately retained. If it should be desired to simply make the nest higher or higher in cooperation with other dimension changes, the same length of trigger may still be used, if it be desired, and the change of dimension be compensated for by providing a larger block 16 or the securing of another similar block thereupon to make up for the additional height, or the trigger itself may be varied in length if it be so desired.

It will be observed that the point to which the door 11 extends in the position illustrated in Figure 2 of the drawings is slightly in advance of that point at which the cross board 13 is positioned, this for the purpose of providing perfect cooperation thereof with the said cross board so that the hen will engage the extended end of the said door in a manner for effecting a proper release thereof, to be later dropped to the trapping position and in a manner for preventing any attempted backing out and effecting a tendency to force the hen on to the nest. During a test of six months of continual use of this nest, I have experienced that no hen has been able to enter the nest without being caught and that at no time was it possible for two hens to crowd into the nest at one time.

The slatted construction of the sides, top and rear wall provide a comfortable cool nest for summer use and also facilitate a ready cleaning of the nest when it is desired, it being understood that when the nest is used in cold weather a plurality of the same may be positioned adjacent each other for the purpose of warmth or covered over with any material which will have the effect of applying warmth and keeping out cold winds.

From the foregoing description, taken in connection with the drawing it is thought that the novel details of construction, practical arrangement and the advantages of my invention will be readily apparent to those skilled in the art to which it relates.

What I claim is:

1. A trap nest comprising a housing having an entrant end, a division board for dividing the housing into a rear nest space and a front free inspection space, a normally closed trap door swingable in the entrant end, and means for holding the said door to the open position releasable upon engaging of the hen with the open door, the said door being positioned so as to restrict passage over the division board into the nest space with the free end thereof terminating at a point between the entrant end and the said division board when in the open or set position.

2. A trap nest comprising a housing having an entrant end, a division board positioned for dividing the housing into a rear nest confining space and a front space of size permitting free walking about and inspection by the hen, a trap door swingably connected to the top of the entrant end, the said door being of a length for terminating at a point between the entrant end and the division board to restrict the passage thereover when the said door is held open or set, means preventing the outward movement of the door when closed, and means for holding the door to its open or set position and automatically releasable upon contact of the hen with the door in passing over the division board.

3. A convertible trap nest comprising a housing having an entrant end, a division board positioned for dividing the housing into a rear nest confining space and a front space of size permitting free walking about and inspection by the hen, a trap door swingably connected to the top of the entrant end, the said door being of a length for terminating at a point between the entrant end and the division board to restrict the passage thereover when the said door is held open or set, means preventing the outward movement of the door when closed, means for holding the door to its open or set position and automatically releasable upon contact of the hen with the door in passing over the division board, the said holding means being adjustable for holding the door at varied set positions and for wedge-securing it to the locked-opened position when desired.

ALBERT NEWTON PETERS